United States Patent [19]

Volk et al.

[11] Patent Number: 4,667,187

[45] Date of Patent: May 19, 1987

[54] LAMP FAILURE MONITORING SYSTEM

[75] Inventors: Jack R. Volk, Ann Arbor; Philip Piatkowski, Jr., Fraser, both of Mich.

[73] Assignee: Ford Motor Company, Dearborn, Mich.

[21] Appl. No.: 817,224

[22] Filed: Jan. 8, 1986

[51] Int. Cl.⁴ .................................. G08B 21/00
[52] U.S. Cl. ........................ 340/641; 315/82; 340/79; 307/101 S
[58] Field of Search ............. 340/641, 642, 643, 52 F, 340/73, 79, 80; 363/53; 315/82, 83, 149, 153, 154, 159; 350/551; 307/311, 101 S

[56] References Cited

U.S. PATENT DOCUMENTS

| | | | |
|---|---|---|---|
| 3,143,729 | 8/1964 | Power | 340/642 |
| 3,457,561 | 7/1969 | Zeisler | 340/79 |
| 3,532,928 | 10/1970 | West | 315/83 |
| 3,633,196 | 1/1972 | Winkler et al. | 340/642 |
| 3,801,975 | 4/1974 | Kitano | 315/130 |
| 3,840,852 | 10/1974 | Schwellenbach | 340/80 |
| 3,868,628 | 2/1975 | Sakurai | 340/80 |
| 3,898,513 | 8/1975 | Kopernik et al. | 315/129 |
| 3,995,262 | 11/1976 | France et al. | 340/643 |
| 4,105,996 | 3/1978 | Shimizu | 340/73 |
| 4,214,236 | 7/1980 | Carp et al. | 340/642 |
| 4,217,576 | 8/1980 | Wreford-Howard | 340/642 |
| 4,234,866 | 11/1980 | Kuroda et al. | 340/52 F |
| 4,348,613 | 9/1982 | Hormel et al. | 315/130 |
| 4,376,909 | 3/1983 | Tagami et al. | 315/82 |

Primary Examiner—James L. Rowland
Assistant Examiner—Daniel Myer
Attorney, Agent, or Firm—Paul K. Godwin, Jr.; Clifford L. Sadler

[57] ABSTRACT

A microprocessor circuit employed to control the on/off switching of a filament lamp in series with a power switching device and a single conductor is programmed to periodically cycle the filament lamp between its de-energized and energized state at a rate above that which would be humanly perceptible. A toroidal ferrite core surrounds the conductor between the lamp filament and the switch and picks up current changes which occur due to the cycling. The absence of current changes during cycling are perceived by the microprocessor as a lamp failure and appropriate signaling is made to indicate the lamp failure.

5 Claims, 1 Drawing Figure

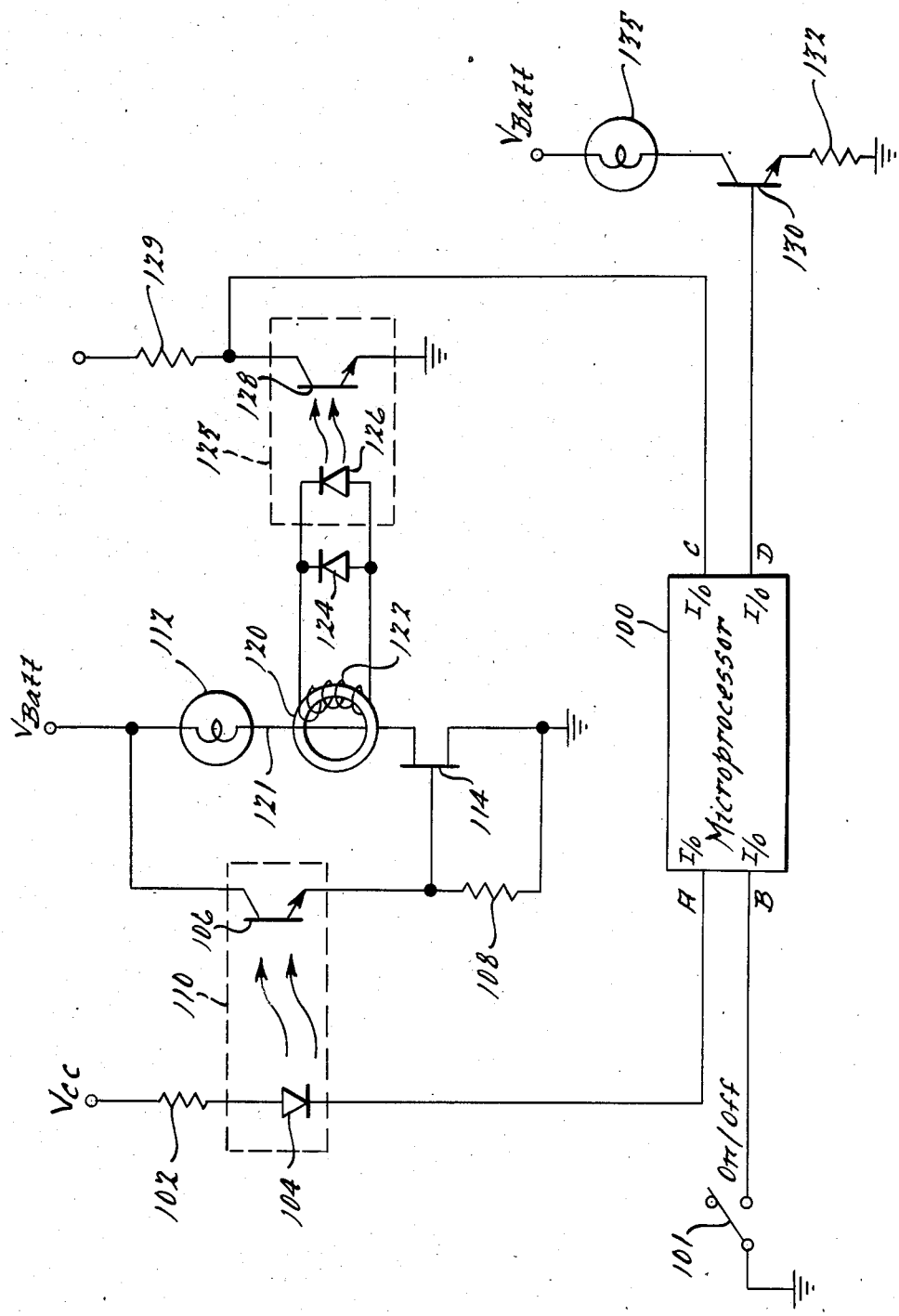

LAMP FAILURE MONITORING SYSTEM

BACKGROUND OF THE INVENTION

1. Field of the Invention

The present invention is directed to the field of detecting open circuits in electrical loads and more specifically to the area of lamp failure detection systems for use on automotiVe vehicles.

2. Description of the Prior Art

For the most part, the prior art in this field is concerned with detecting integrity of a filament in a lamp by monitoring the amount of current that flows in the lamp after it has been switched on. For instance, U.S. Pat. No. 3,457,561; 3,532,928; and 3,840,852 disclose systems in which current levels are detected after lamps have been energized and indications of failure are made when ourrents are below predetermined threshhold levels.

Other systems provide pulsation to the lamp circuit and compare voltage potentials or impedance levels present in the lamp circuit so as to detect open filaments in the lamps. U.S. Pat. Nos. 3,633,196; 3,995,262; and 3,898,513 illustrate examples of these prior art circuits.

SUMMARY OF THE INVENTION

The present invention is related to our copending U.S. application Ser. No. 817,223, titled "A SYSTEM FOR DETECTING THE FAILURE OF A FILAMENT LAMP" that is being filed concurrently herewith.

The present invention distinguishes from our copending application by providing a method and apparatus for continually monitoring the integrity of a filament lamp circuit during energized and deenergized conditions by providing a periodic cycle from its present state of energization to its opposite state and back, while simultaneously detecting the changes of current flow which occur during that cycle period. The present invention furthur provides the use of a toroidal ferrite core transformer surrounding the conductor leading to the filament of the lamp and a secondary coil that is wound around the toroidal core to provide a pick-up of any current changes occuring in that conductor. The present invention is controlled by a suitably programmed microprocessor which is employed to not only control the on/off operation of the lamp load but to also provide periodic pulsations and comparisons of sensed current changes in the lamp conductor in order to provide indications of a failure, if appropriate.

BRIEF DESCRIPTION OF THE DRAWING

A circuit for implementing the preferred embodiment of the present invention is shown.

DETAILED DESCRIPTION OF THE PREFERRED EMBODIMENT

In the preferred embodiment, an incandescent lamp 112 containing a filament winding, is shown as having one end connected to one pole of a source of DC voltage potential "$V_{batt}$". The other end of the filament winding of the incandescent lamp 112 is connected to a conductor 121 which, is in turn, connected to a control gating transistor 114 having conducting and nonconducting states. The other side of the switching transistor 114 is connected to ground (the opposite pole of the source of DC voltage potential from that designated as $V_{batt}$). A photo sensitive transistor 106 is connected between the source of DC voltage potential $V_{batt}$ and the control gate of transistor 114. A biasing resistor 108 is connected between the junction, of the emitter of photo-sensitive transistor 106 and the gate of transistor 114 and ground. A light emitting diode 104 is connected in series with a resistor 102 and a positive DC voltage potential $V_{cc}$. The cathode of the light emitting diode 104 is connected to an input/output (I/O) terminal "A" of the microprocessor 100. The light emittinq diode 104 and the photosensitive transistor 106 are contained within an opto-isolator 110 which is effective to prevent extraneous light from beinq received by the photosensitive transistor 106. A lamp on/off switch 101 is shown connected between ground and a "B" I/O terminal of the microprocessor 100.

The programming of the microprocessor 100 is such that it responds to the grounding of the "B" terminal through switch 101 by providing a low impedance path to ground for the oathode oft he light emitting diode 104. The diode 104 thereby becomes energized and produces light energy which is directed towards and received by the photo-sensitive transistor 106. The photo-sensitive transistor 106 is then biased to its low impedance state, which in turn gates the transistor 114 into its conducting state. Current then flows from the source of DC voltage potential $V_{batt}$, through the filament of the incandescent lamp 112, the conductor 12 and the transistor 114, to ground. Of course, the current level is such that the lamp 112 provides illumination at a predetermined rating to provide the appropriate visibility for its desired purpose.

A current sensing circuit is provided, in the form of a transformer to inductively pick up current flow changes in the conductor 121. A light emitting diode 126 is provided within an opto-isolator housing 125 to emit light energy towards a photo sensitive transistor 128 when the voltage appearing at the secondary winding 122 is of a correct polarity. A shunting diode 124 is proVided in parallel to 126 so as to shunt the light, emitting diode 126 when pulses of the opposite polarity are present on the secondary winding 122.

The collector of the photo sensitive transistor 128 is monitored at the I/O terminal "C" of the microprocessor 100. The voltage level at the collector is dropped through a resistor 129 from a voltage source $V_{cc}$. Therefore. whenever light is emitted by the light emitting diode 126, the photo sensitive transistor 128 will be biased into its conducting state and thereby lower the voltage level present at I/O terminal "C".

The sensing transformer comprises a toroidal ferrite core 120 which surrounds the conductor 121. The conductor 121 thereby defines a single turn primary in which current changes are induced into the secondary winding 122. The purpose of such a nonintrusion sensing device to detect current flow in the lamp circuit is essential to prevent failures in the sensing circuit from effecting the critical light actuation control for a vehicle lighting system.

The I/O terminal "D" of the microprocessor 100 is connected to the base of a switching transistor 130 which has its collector connected to an indicator lamp 135 and its emitter connected to a dropping resistor 132.

In operation, the microprocessor 100 responds to the off or on setting of the control switch 101 to provide an appropriate high or low level impedance at its I/O terminal "A" to place the incandescent lamp load 112 to its deenergized or energized condition.

The microprocessor 100 is also appropriately programmed to provide the continuous updating and monitoring of the incandescant lamp condition with a "lamp test routine" as indicated below.

| INSTRUCTIONS | REMARKS |
| --- | --- |
| 10 If I/O "B" = low, go to 110 | Check switch status |
| 20 Set I/O "A" = low | Turn lamp on |
| 30 Go sub 700 | Delay for 300 μ sec |
| 40 Read I/O "C" | |
| 50 If I/O "C" = high, go sub 500 | Detect lamp failure |
| 60 Set I/O "A" = high | Restore lamp to off |
| 70 Go to 1000 | Exit |
| 110 Set I/O "A" = high | Turn lamp off |
| 120 Go Sub 700 | Delay for 300 μ sec |
| 130 Set I/O "A" = low | Turn lamp on |
| 140 Go Sub 700 | Delay read 300μ sec |
| 150 Read I/O "C" | |
| 160 If I/O "C" = high, go sub 500 | Detect lamp failure |
| 170 Go to 1000 | Exit |
| 500 Set bit in memory | Record lamp failure |
| 510 Set I/O "D" = high | Latch lamp failure lamp |
| 520 Return | |
| 700 For X = 1 to 700 | 300μ sec. Delay Subroutine |
| 710 Next X | |
| 720 Return | |
| 1000 After 1 min. return to 10 | |

As can be seen from the foregoing lamp test routine, if the microprocessor 100 is holding the lamp load 112 in its deenergized condition, the lamp will be turned on for a short period (300 μsec) and the condition of the collector 128 will then be sensed to determine if current is flowing is produced in the conductor 121. If a corresponding current flow is detected due to the short pulse applied then the integrity of the series circuit for the lamp 112 is verified. However, if no current is sensed through the conductor 121 and the collector of transistor 128 remains at a high level, the microprocessor 100 is instructed to set its I/O terminal "D" at a high logic level in order to latch the lamp failure indicator liqht 135 in an energized condition.

Correspondingly, if the switch 101 is closed and the microprocessor 100 causes the lamp 112 to be energized by providing a low impedance at its I/O terminal "A", the lamp test routine will cause the lamp 112 to be deenergized for approximately 300 μsec., then turned on and monitored after another 300 μsec. at the I/O terminal "C". If, after the delay of 300 μsec., the collector voltage of transistor 128 is at a low level, verification of the lamp integrity ls achieved. However, if the collector voltage of transistor 128 is at a high level, the microprocessor then provides a latching of the indicator lamp 135 in an on condition indicating an open circuit in the lamp load 112.

As can be seen for the above discussion, the primary advantage of the present invention is due to the fact that it provides a nonintrusive sensing of the integrity of a series circuit with a response time that is of sufficiently high speed so as not to be discernable to the human eye. In addition, the present invention provides for continuous monitoring of those critical series lamp circuits such as headlamps and taillights and provides for indication of filament or other wiring failure in those lamp clrcuits regardless of the energization state of the lamps.

It will be apparent that many modifications and variations may be implemented without departing from the scope of the novel concept of this invention. Therefore, it is intended by the appended claims to cover all such modifications and variations which fall within the true spirit and scope of the invention.

We claim:

1. A system for monitoring the integrity of a series circuit containing a single incandescent lamp and associated conductors between a source of DC voltage and a switching device controllable to either an opened or closed condition, comprising:

means for periodically cycling said switching device between its opened and closed conditions;

means for correspondingly sensing periodic current flow in one of said lamp conductors;

means for indicating a failure of circuit continuity when said circuit sensing means fails to sense periodic current flow in said one conductor; and wherein said switching device is a power transistor that is independently controlled to either its conducting or nonconducting state and said cycling means periodically changes the biasing of said power transistor from its independently controlled state to its opposite state and back again.

2. A system as in claim 1, wherein said cycling means changes the biasing of said power transistor from its independently controlled state to its opposite state and back again within a sufficiently short time period that changes in the visible light emitting condition of said incandescent lamp are not perceptible to the human eye.

3. A system as in claim 2, wherein said periodic occurance of cycling by said cycling means is approximately once per minute and each cycling is performed over a period of approximately 300 μsec.

4. A system as in claim 1, wherein said current sensing means comprises a torroidal ferrite core transformer having a primary winding defined by a portion of one of said lamp conductors passing through said toroidal ferrite core and a secondary winding defined by a plurality of wire turns on a portion of said core.

5. A system as in claim 1, wherein said indicating means includes a humanly perceptible warning element and means for latching said warning element in an energized condition as long as said failure is detected.

* * * * *